United States Patent
Luo

(10) Patent No.: US 12,317,345 B2
(45) Date of Patent: May 27, 2025

(54) BLUETOOTH EARPHONE CONNECTION SWITCHING METHOD, APPARATUS AND DEVICE, AND STORAGE MEDIUM

(71) Applicant: GOERTEK INC., Shandong (CN)

(72) Inventor: Junyu Luo, Shandong (CN)

(73) Assignee: GOERTEK INC., Weifang (CN)

( * ) Notice: Subject to any disclaimer, the term of this patent is extended or adjusted under 35 U.S.C. 154(b) by 441 days.

(21) Appl. No.: 17/995,160

(22) PCT Filed: Oct. 29, 2020

(86) PCT No.: PCT/CN2020/124830
§ 371 (c)(1),
(2) Date: Sep. 30, 2022

(87) PCT Pub. No.: WO2021/196577
PCT Pub. Date: Oct. 7, 2021

(65) Prior Publication Data
US 2023/0156838 A1 May 18, 2023

(30) Foreign Application Priority Data

Mar. 30, 2020 (CN) .......................... 202010238496.1

(51) Int. Cl.
*H04W 4/80* (2018.01)
*H04R 1/10* (2006.01)
(Continued)

(52) U.S. Cl.
CPC .......... *H04W 76/14* (2018.02); *H04R 1/1041* (2013.01); *H04R 2420/07* (2013.01); *H04W 84/20* (2013.01)

(58) Field of Classification Search
CPC ... H04W 84/20; H04W 12/069; H04W 28/18; H04W 84/18; H04W 76/14; H04W 4/80;
(Continued)

(56) References Cited

U.S. PATENT DOCUMENTS 6,795,421 B1 * 9/2004 Heinonen ............. H04W 88/08
455/41.2
8,396,424 B2 * 3/2013 Frazier ................... H04W 84/20
455/433
(Continued)

FOREIGN PATENT DOCUMENTS

CN 102811274 A 12/2012
CN 104683003 A 6/2015
(Continued)

OTHER PUBLICATIONS

International Search Report from International Application No. PCT/CN2020/124830 mailed Jan. 28, 2021.

*Primary Examiner* — Cindy Trandai
(74) *Attorney, Agent, or Firm* — Shih IP Law Group, PLLC

(57) ABSTRACT

Some embodiments of the present application disclose a Bluetooth earphone connection switching method, apparatus and device, and a storage medium. The Bluetooth earphone connection switching method comprises the following steps: a master device establishes a communication connection with all slave devices, and establishes a Bluetooth connection with a Bluetooth earphone; upon detecting a preset event, a slave device sends an earphone connection request instruction to the master device, and converts to a master mode; upon receiving the earphone connection request instruction, the master device disconnects the Bluetooth connection with the Bluetooth earphone; and upon receiving a permission instruction fed back by the master device, the slave device which has converted to the master mode establishes a Bluetooth connection with the Bluetooth earphone according to pre-stored Bluetooth earphone pairing (Continued)

information, thereby completing Bluetooth earphone connection switching between the master device and the slave device.

9 Claims, 2 Drawing Sheets

(51) Int. Cl.
*H04W 76/14* (2018.01)
*H04W 84/20* (2009.01)

(58) Field of Classification Search
CPC ....... H04L 63/0869; H04L 12/28; H04L 7/00; H04L 65/00; H04R 1/1041; H04R 2420/07; H04R 1/10
See application file for complete search history.

(56) References Cited

U.S. PATENT DOCUMENTS

| | | | | |
|---|---|---|---|---|
| 2002/0055978 | A1* | 5/2002 | Joon-Bo | H04W 84/20 709/209 |
| 2006/0072525 | A1* | 4/2006 | Hillyard | H04W 84/20 370/338 |
| 2011/0177780 | A1 | 7/2011 | Sato et al. | |
| 2012/0084446 | A1* | 4/2012 | Iinuma | H04W 36/0079 709/227 |
| 2013/0316642 | A1* | 11/2013 | Newham | H04W 52/0206 455/67.11 |
| 2015/0215973 | A1* | 7/2015 | Nguyenvan | H04W 76/36 370/329 |
| 2016/0381728 | A1* | 12/2016 | Cohn | H04W 76/14 370/329 |
| 2017/0093510 | A1 | 3/2017 | Lin | |
| 2017/0289739 | A1 | 10/2017 | Trip et al. | |
| 2018/0014145 | A1 | 1/2018 | Seaman | |
| 2020/0252993 | A1* | 8/2020 | Srivastava | H04W 36/304 |
| 2020/0382950 | A1* | 12/2020 | Fornshell | H04W 4/80 |

FOREIGN PATENT DOCUMENTS

| | | |
|---|---|---|
| CN | 104683940 A | 6/2015 |
| CN | 105827264 A | 8/2016 |
| CN | 108710597 A | 10/2018 |
| CN | 108924706 A | 11/2018 |
| CN | 109548184 A | 3/2019 |
| CN | 109890021 A | 6/2019 |
| CN | 110167194 A | 8/2019 |
| CN | 110191442 A | 8/2019 |
| CN | 111432386 A | 7/2020 |

* cited by examiner

BLUETOOTH EARPHONE CONNECTION SWITCHING METHOD, APPARATUS AND DEVICE, AND STORAGE MEDIUM

The present application claims the priority of Chinese Patent Application No. 202010238496.1 with invention title "BLUETOOTH EARPHONE CONNECTION SWITCHING METHOD, APPARATUS AND DEVICE, AND STORAGE MEDIUM", filed in the China Patent Office on Mar. 30, 2020, which is hereby incorporated by reference in its entirety.

TECHNICAL FIELD

The present disclosure relates to the technical field of Bluetooth communication, and in particular, relates to a Bluetooth earphone connection switching method, apparatus and device, and a computer readable storage medium.

BACKGROUND ART

With the development of technology, most users have a plurality of mobile devices, such as a plurality of mobile phones, computers or tablet PCs, however Bluetooth earphones generally can only be connected to one mobile device one time, that is, Bluetooth earphones can maintain only be connected to one of the mobile devices one time to provide functions such as music playing and calling to the connected mobile device. When another mobile device which is not connected to the Bluetooth earphone is dialed in, or the user needs to use another mobile device to play music, the user needs to manually disconnect the current Bluetooth connection between the Bluetooth earphone and the connected mobile device, and then connect the mobile device to be used and the Bluetooth earphone by Bluetooth, which increases user operations and reduces user experience.

SUMMARY

A main object of the present application is to provide a Bluetooth earphone connection switching method, apparatus and device, and a computer readable storage medium, aiming to solve the existing technical problem that the user needs to manually disconnect the connection between the Bluetooth earphone and a plurality of mobile devices, which results in poor user experience.

In order to achieve the above purpose, the present application provides a Bluetooth earphone connection switching method, which is applied to a Bluetooth earphone connection switching apparatus, the Bluetooth earphone connection switching method comprises the following steps:
a master device establishes a communication connection with all slave devices, and establishes a Bluetooth connection with the Bluetooth earphone;
upon detecting a preset event, one slave device sends an earphone connection request instruction to the master device, and converts to a master mode;
upon receiving the earphone connection request instruction, the master device disconnects a Bluetooth connection with the Bluetooth earphone; and
upon receiving a permission instruction fed back by the master device, the slave device which has converted to the master mode establishes a Bluetooth connection with the Bluetooth earphone according to pre-stored Bluetooth earphone pairing information, thereby completing Bluetooth earphone connection switching between the master device and the slave devices.

Optionally, the earphone connection request instruction includes a temporary connection request instruction, and the step that upon detecting a preset event, one slave device sends an earphone connection request instruction to the master device, and converts to a master mode, specifically comprises:
upon detecting the preset event, one slave device determines whether the preset event is a temporary connection event according to a preset event connection list; and
if the preset event is the temporary connection event, the slave device which has detected the preset event sends the temporary connection request instruction to the master device, and converts to a master mode.

Optionally, after the step that if the preset event is the temporary connection event, the slave device which has detected the preset event sends the temporary connection request instruction to the master device, and converts to the master mode, the Bluetooth earphone connection switching method further comprises:
the master device adds a preset identifier to the slave device which has converted to the master mode, and upon detecting an end of the preset event, the master device sends a connection authority return request to the slave device in which the preset identifier is added;
upon receiving the connection authority return request, the slave device in which the preset identifier is added feeds back a master-slave switching response instruction to the master device, and converts to a slave mode, disconnects the Bluetooth connection with the Bluetooth earphone, and disconnects a communication connection with other slave devices; and
upon receiving the master-slave switching response instruction, the master device converts to the master mode, establishes a Bluetooth connection with the Bluetooth earphone, and establishes a communication connection with all of the slave devices, so as to monitor a master-slave device switching request triggered by all of the slave devices.

Optionally, the earphone connection request instruction includes a long-term connection request instruction, and after the step that upon detecting the preset event, one slave device determines whether the preset event is a temporary connection event according to a preset event connection list, the Bluetooth earphone connection switching method further comprises:
if the preset event is not the temporary connection event, determines whether the preset event is a long-term connection event according to the preset event connection list; and
if the preset event is the long-term connection event, the slave device which has detected the preset event sends the long-term connection request instruction to the master device and converts to the master mode.

Optionally, the connection switching apparatus further includes a master controller, and before the step that the master device establishes a communication connection with all slave devices, and establishes a Bluetooth connection with a Bluetooth earphone, the Bluetooth earphone connection switching method further comprises:
the master controller acquires a connection time between all devices and the Bluetooth earphone, sets a device having the longest connection time as the master device, and sets other devices as slave devices, wherein all the devices comprise the master device and all of the slave devices.

Optionally, the communication connection includes a Bluetooth connection, and before the step that the master device establishes a communication connection with all of the slave devices, and establishes a Bluetooth connection with the Bluetooth earphone, the Bluetooth earphone connection switching method further comprises:

the master device sets all of the slave devices and the Bluetooth earphone as confidence devices;

all of the slave devices set the master device and the Bluetooth earphone as confidence devices; and the master controller sets the master device and all of the slave devices as confidence devices of the Bluetooth earphone.

Optionally, the step that upon receiving a permission instruction fed back by the master device, the slave device which has converted to the master mode establishes a Bluetooth connection with the Bluetooth earphone according to pre-stored Bluetooth earphone pairing information, thereby completing Bluetooth earphone connection switching between the master device and the slave device specifically includes:

upon receiving the permission instruction, the slave device which has converted to the master mode establishes a Bluetooth connection with the Bluetooth earphone according to the pre-stored Bluetooth earphone pairing information and first confidence device information; and the slave device which has converted to the master mode establishes a Bluetooth connection with the master device and other slave devices according to pre-stored Bluetooth earphone pairing information and second confidence device information, so as to monitor a master-slave device switching request of the master device and other slave devices, thereby completing Bluetooth earphone connection switching between the master device and the slave device.

Optionally, the preset event includes an incoming call event, a voice call event, a video call event and/or an audio playing event.

Furthermore, in order to achieve the above purpose, the present application also provides a Bluetooth earphone connection switching device, the Bluetooth earphone connection switching device comprises a processor, a memory, and a Bluetooth earphone connection switching program stored in the memory and executable by the processor, wherein when the Bluetooth earphone connection switching program is executed by the processor, the steps of the Bluetooth earphone connection switching method as described in the above are implemented.

Furthermore, in order to achieve the above purpose, the present application also provides a computer readable storage medium in which a Bluetooth earphone connection switching program is stored, wherein when the Bluetooth earphone connection switching program is executed by a processor, the steps of the Bluetooth earphone connection switching method as described in the above are implemented.

The present application provides a Bluetooth earphone connection switching method, which is applied to a Bluetooth earphone connection switching apparatus, the Bluetooth earphone connection switching method includes: a master device establishes a communication connection with all slave devices, and establishes a Bluetooth connection with a Bluetooth earphone; upon detecting a preset event, a slave device sends an earphone connection request instruction to the master device, and converts to a master mode; upon receiving the earphone connection request instruction, the master device disconnects the Bluetooth connection with the Bluetooth earphone; and upon receiving a permission instruction fed back by the master device, the slave device which has converted to the master mode establishes a Bluetooth connection with the Bluetooth earphone according to pre-stored Bluetooth earphone pairing information, thereby completing Bluetooth earphone connection switching between the master device and the slave device. In this way, upon detecting the occurrence of a preset event that requires the Bluetooth earphone to be connected, the slave device can send an earphone connection request instruction to the master device connected to the Bluetooth earphone through the communication connection with the master device, and the master device disconnects the Bluetooth connection with the Bluetooth earphone, and a new Bluetooth connection between the slave device where the preset event occurs and the Bluetooth earphone is established, thereby completing an automatic switching of Bluetooth earphone connection between the master device and the slave device, which reduces the operations of user, increases Bluetooth earphone connection switching efficiency, improves the user experience, and solves the existing technical problem that the user needs to manually disconnect the connection between the Bluetooth earphone and a plurality of mobile devices which results in poor user experience.

BRIEF DESCRIPTION OF THE DRAWINGS

In order to more clearly illustrate the embodiments of the present application or the technical solutions in the prior art, the following will briefly introduce the accompanying drawings required for the description of the embodiments or the prior art. Obviously, the drawings in the following description are only part of the drawings of the present application, and for those skilled in the art, other drawings can also be obtained according to the provided drawings without any creative effort.

DETAILED DESCRIPTION OF THE EMBODIMENTS

The technical solutions in the embodiments of the present application will be described below with reference to the drawings in the embodiments of the present application. Obviously, the described embodiments are only part of the embodiments of the present application, rather than all the embodiments. Based on the embodiments in the present application, all other embodiments obtained by persons of ordinary skill in the art without creative efforts shall fall within the protection scope of the present application.

The Bluetooth earphone connection switching method provided by the embodiments of the present application is mainly applied to a Bluetooth earphone connection switching device, which may be a device having display and processing functions such as a PC, a portable computer, and a mobile terminal.

Figure 1:
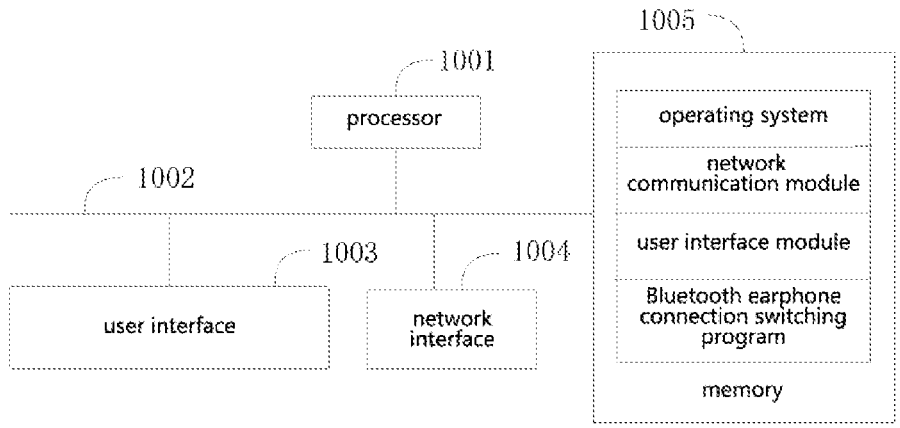
FIG. 1 is a schematic view of a hardware structure of a Bluetooth earphone connection switching device according to an embodiment of the present application.

Referring to FIG. 1, which is schematic view of a hardware structure of a Bluetooth earphone connection switching device according to an embodiment of the present application. In the embodiment of the present application, the Bluetooth earphone connection switching device may include a processor 1001 (for example, a CPU), a communication bus 1002, a user interface 1003, a network interface 1004, and a memory 1005. Wherein, the communication bus 1002 is used to realize connection communication between these components; the user interface 1003 may include a display screen (for example, Display), an input unit such as a keyboard; the network interface 1004 may optionally include a standard wired interface, a wireless interface (for example, a WI-FI interface); the memory 1005 may be a high-speed RAM memory, or a stable memory (non-volatile memory) such as a disk memory, and the memory 1005 may optionally be a storage device independent of the aforementioned processor 1001.

Those skilled in the art can understand that the hardware structure shown in FIG. 1 does not limit the Bluetooth earphone connection switching device, and may include more components or less components than those illustrated, and a combination of some components, or different component arrangements are possible.

Continuing to refer to FIG. 1, the memory 1005, which is a computer-readable storage medium may include an operating system, a network communication module, and a Bluetooth earphone connection switching program in FIG. 1.

In FIG. 1, the network communication module is mainly used to connect servers and perform data communication with the server; and the processor 1001 may call the Bluetooth earphone connection switching program stored in the memory 1005 and execute the Bluetooth earphone connection switching method provided in the embodiment of the present application.

An embodiment of the present application provides a Bluetooth earphone connection switching method.

Figure 2:
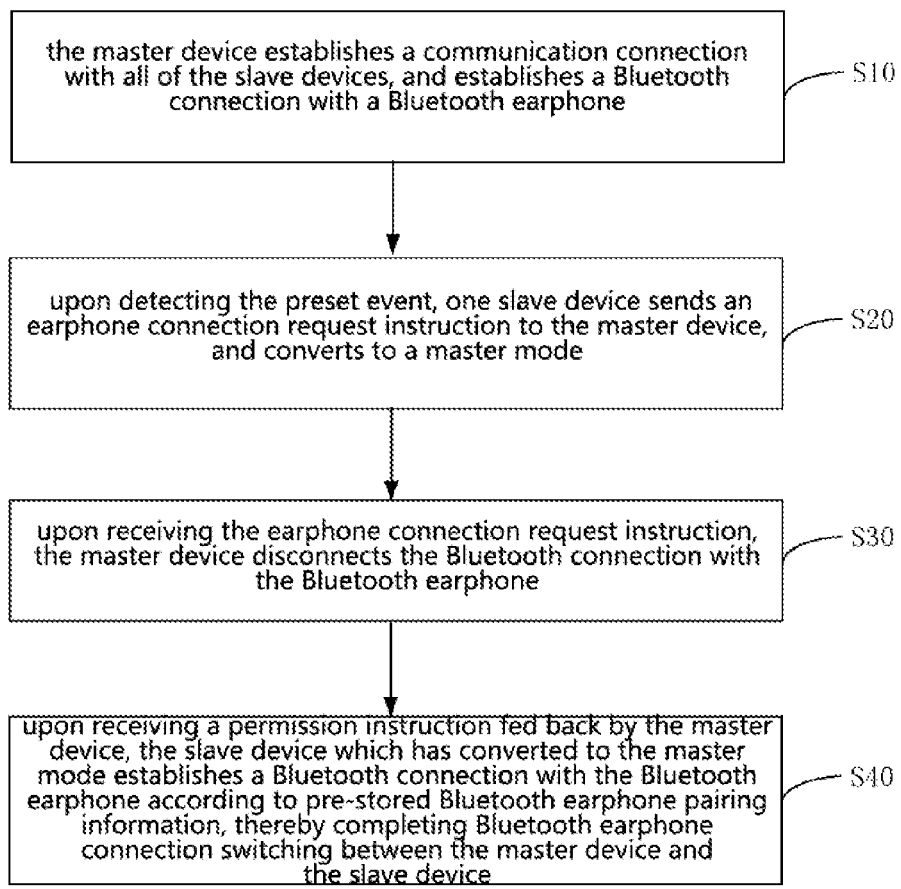
FIG. 2 is a schematic flowchart according to a first embodiment of a Bluetooth earphone connection switching method of the present application.

Referring to FIG. 2, which is a schematic flowchart according to a first embodiment of a Bluetooth earphone connection switching method of the present application.

In the embodiment, the Bluetooth earphone connection switching method is applied to a Bluetooth earphone connection switching apparatus, and the Bluetooth earphone connection switching method includes the following steps:

Step S10, the master device establishes a communication connection with all slave devices, and establishes a Bluetooth connection with a Bluetooth earphone;

With the development of technology and the improvement of people's living standards, users generally have a plurality of mobile devices such as a plurality of mobile phones, computers and PADs. However, users generally only wear one pair of Bluetooth earphones, which are only connected to one of the mobile devices one time so as to provide users with functions such as music playing or calling. However, if another mobile device is dialed in, or the user wants to play music by using another mobile device, the user needs to manually disconnect the current Bluetooth connection and then connect and use a new mobile device and re-select a new Bluetooth connection, which results in poor user experience. In order to solve the above problems, the present application uses a mobile device as a master device to conduct a Bluetooth connection with the Bluetooth earphone and other multiple mobile devices which are slave devices. The mobile device as the master device establishes a Bluetooth connection with the Bluetooth earphone to realize audio functions such as music playing and calling. When other mobile devices are dialed in or turn on the music playing function, a device in which audio service is required sends a Bluetooth earphone connection request to the master device, and the current master device converts to slave mode and disconnects the Bluetooth connection with the Bluetooth earphone. The slave device in which audio service is required converts to master mode and establishes a new connection with the Bluetooth earphone, so as to realize the automatic switching of the master device of the Bluetooth earphone and improve the user experience. Specifically, this system consists of a Bluetooth earphone and a plurality of mobile devices having Bluetooth communication function, and in this embodiment, three mobile devices of device A, device B, and device C and a pair of Bluetooth earphones are used as an example. A mobile device is used as a master device to connect with the Bluetooth earphone and establish communicate connections (including but not limited to Bluetooth connection or wireless connection and the like) with a plurality of other mobile devices which are slave devices, to receive audio service request information sent by the slave device. When the mobile device A used as the master device establishes a Bluetooth connection with the Bluetooth earphone, audio functions such as music playing or calling are realized. The mobile device A used as the master device establishes actual communication connections with a plurality of other mobile devices B used as slave devices at the same time, and the slave devices B may send audio service request information of the slave devices B to the master device A in real time.

Wherein, the connection switching apparatus further includes a main controller, and before step S10, the method further includes:

the master controller acquires a connection time between all devices and the Bluetooth earphone, and sets a device with the longest connection time as the master device, and sets other devices as slave devices, wherein all the devices include the master device and all of the slave devices.

The present embodiment is configured to acquire the connection time between all devices, that is, including the master device and all slave devices, and the Bluetooth earphone. The device having the longest connection time with the Bluetooth earphone has a greater demand for the Bluetooth earphone and is preferentially set as the master device, and other devices are set as slave devices. A specific embodiment may also determine the master device and the slave device at each of time points according to the time point at which each of the devices is connected with the Bluetooth earphone.

Step S20, upon detecting a preset event, a slave device sends an earphone connection request instruction to the master device, and converts to a master mode;

In this embodiment, upon detecting a preset event, that is, when the slave device B is dialed in or the slave device B turns on the music playing function, the slave device B sends an earphone connection request instruction (i.e., audio service request information) to the master device A. Wherein, the preset event includes an incoming call event, a voice call event, a video call event and/or an audio playing event. After the slave device B sends the audio service request information, the slave device converts to the master mode, and initiates a call to other devices, to establish a communication connection with the other devices, so as to receive the audio service request information sent by the other devices.

Step S30, upon receiving the earphone connection request instruction, the master device disconnects the Bluetooth connection with the Bluetooth earphone;

In this embodiment, after the master device A receives the request information, i.e., the earphone connection request instruction, the master device A spontaneously disconnects the connection with the Bluetooth earphone, and converts to the slave mode.

Step S40, upon receiving a permission instruction fed back by the master device, the slave device which has converted to the master mode establishes a Bluetooth connection with the Bluetooth earphone according to pre-stored Bluetooth earphone pairing information, thereby completing Bluetooth earphone connection switching between the master device and the slave device.

In this embodiment, by means of completing the pairing of each mobile device and the Bluetooth earphone in advance, the information such as the address and pairing password of the Bluetooth earphone is obtained, the device B can directly call the Bluetooth earphone and conduct a Bluetooth connection with the Bluetooth earphone. Since the master device A disconnects the Bluetooth connection with the Bluetooth earphone after receiving the request information, the Bluetooth earphone is in a disconnected state, and confidence information of the device B has been recorded, a Bluetooth connection can be directly established without re-pairing, thereby completing the Bluetooth earphone connection switching between the master device and the slave device.

The present application provides a Bluetooth earphone connection switching method, which is applied to a Bluetooth earphone connection switching apparatus, the Bluetooth earphone connection switching method includes: a master device establishes a communication connection with all slave devices, and establishes a Bluetooth connection with a Bluetooth earphone; upon detecting a preset event, a slave device sends an earphone connection request instruction to the master device, and converts to a master mode; upon receiving the earphone connection request instruction, the master device disconnects the Bluetooth connection with the Bluetooth earphone; and upon receiving a permission instruction fed back by the master device, the slave device which has converted to the master mode establishes a Bluetooth connection with the Bluetooth earphone according to pre-stored Bluetooth earphone pairing information, thereby completing Bluetooth earphone connection switching between the master device and the slave device. In this way, upon detecting the occurrence of a preset event that requires the Bluetooth earphone to be connected, the slave device can send an earphone connection request instruction to the master device connected to the Bluetooth earphone through the communication connection with the master device, and the master device disconnects the Bluetooth connection with the Bluetooth earphone, and a new Bluetooth connection between the slave device where the preset event occurs and the Bluetooth earphone is established, thereby completing an automatic switching of Bluetooth earphone connection between the master device and the slave device, which reduces operations of user, increases Bluetooth earphone connection switching efficiency, improves the user experience, and solves the existing technical problem that the user needs to manually disconnect the connection between the Bluetooth earphone and a plurality of mobile devices, which results in poor user experience.

Figure 3:
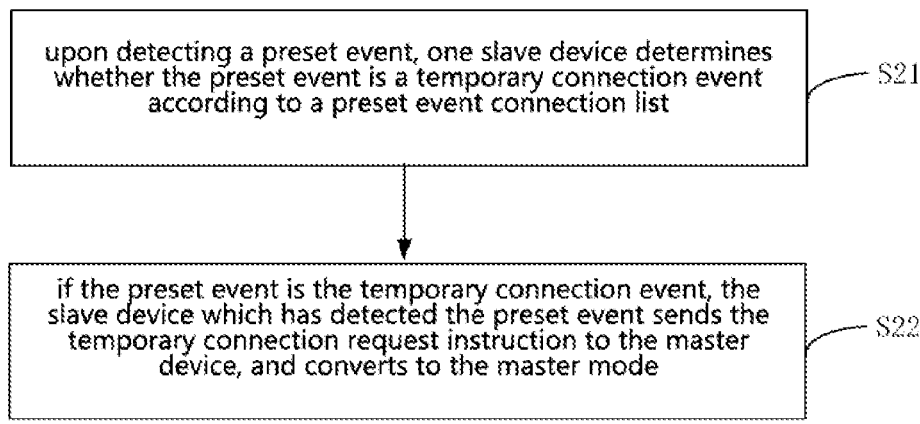
FIG. 3 is a schematic flowchart according to a second embodiment of a Bluetooth earphone connection switching method of the present application.

Referring to FIG. 3, which is a schematic flowchart according to a second embodiment of a Bluetooth earphone connection switching method of the present application.

Based on the embodiment shown in FIG. 2, in this embodiment, the earphone connection request instruction includes a temporary connection request instruction, the step S20 specifically includes:

Step S21, upon detecting a preset event, a slave device determines whether the preset event is a temporary connection event according to a preset event connection list; and Step S22, if the preset event is the temporary connection event, the slave device which has detected the preset event sends the temporary connection request instruction to the master device, and converts to the master mode.

Furthermore, after the step that if the preset event is the temporary connection event, the slave device which has detected the preset event sends the temporary connection request instruction to the master device, and converts to the master mode, the method further includes:

the master device adds a preset identifier to the slave device which has converted to the master mode, and upon detecting an end of the preset event, the master device sends a connection authority return request to the slave device in which the preset identifier is added;

upon receiving the connection authority return request, the slave device in which the preset identifier is added feeds back a master-slave switching response instruction to the master device, and converts to a slave mode, disconnects the Bluetooth connection with the Bluetooth earphone, and disconnects a communication connection with other slave devices; and upon receiving the master-slave switching response instruction, the master device converts to the master mode, establishes a Bluetooth connection with the Bluetooth earphone, and establishes a communication connection with all slave devices, so as to monitor a master-slave device switching request triggered by all of the slave devices.

In this embodiment, after the slave device B receives the response of allowing temporary master-slave switching sent by the master device A, the device A is marked as a device that is required to return the master device authority, and switches to the master mode, the slave device B becomes the master device B. The master device B initiates a calling, and since the device B has completed the pairing with the Bluetooth earphone, the device A and the device C in advance, and the information such as the address and pairing password of the above-mentioned devices has been obtained, the master device B can directly call the above-mentioned slave devices. The above-mentioned slave devices have recorded the confidence information of device B, and can directly establish the connection without pairing once again, thereby realizing the Bluetooth connection between the master device B and the Bluetooth earphone, the device A, the device C, so as to realize the automatic switching of master device of the Bluetooth earphone, that is, the Bluetooth earphone playing the audio content of device A switches to the communication operation of device B. When the communication ends, the master device B sends the master device authority return request information to the slave device A marked as the device that is required to return the master device authority, the slave device A receives the request information and replies to the master device B with a response of master-slave switching, then the slave device A switches to the master mode. The slave device A becomes the master device A. At the same time, after the master device B receives the response of master-slave switching sent by the slave device A, the master device B spontaneously disconnects the connection with the slave devices (including the Bluetooth earphone, the device A and the device C), and switches to the master mode, and the slave device B becomes the master device B. The master device A initiates a calling, and since the information such as addresses and pairing password of the slave device B, the slave device C and the Bluetooth earphone has been obtained, the master device A can directly call the above-mentioned slave devices. The above-mentioned slave devices have recorded the confidence information of device B, and can directly establish the connection without pairing once again, thereby realizing the Bluetooth connection between the master device A and the Bluetooth earphone, device B, device C, so as to realize the automatic switching of master device of the Bluetooth earphone, that is, the Bluetooth earphone resumes playing the audio content of device A.

Furthermore, the earphone connection request instruction includes a long-term connection request instruction, and after the step S21, the method further includes:
 if the preset event is not the temporary connection event, determines whether the preset event is a long-term connection event according to the preset event connection list; and
 if the preset event is the long-term connection event, the slave device which has detected the preset event sends the long-term connection request instruction to the master device, and converts to the master mode.

In this embodiment, when the user turns on the audio playing function of the slave device C, the slave device C sends the audio service request information to the master device A, and the master device A receives the request information and replies to the slave device C with a response of allowing long-term master-slave switching, then the master device A spontaneously disconnects the connection with the slave devices (including the Bluetooth earphone, the device A and the device C), and switches to the slave mode. The master device A becomes the slave device A. After the slave device C receives the response of allowing long-term master-slave switching sent by the master device A, the slave device C directly converts to the master mode. Since the music playing function means a long-term connection time, the slave device C becomes the master device C without marking the device A as a device that is required to return the master device authority (that is, the device C obtains the default master device authority) and switching to master mode. The master device C initiates a calling, and since the device C has completed the pairing with the Bluetooth earphone, the device A and the device C in advance, and the information such as the address and pairing password of the above-mentioned devices has been obtained, the master device C can directly call the above-mentioned slave devices and directly established the connection, thereby realizing the Bluetooth connection between the master device C and the Bluetooth earphone, the device A, the device C, so as to realize the automatic switching of master device of the Bluetooth earphone, that is, the Bluetooth earphone playing the audio content of device A switches to the audio playing operation of device C. Through the above operations, the device that plays audio can be set as the default master device, and the playing audio content can be listened through the Bluetooth earphone; the device with incoming calls can obtain temporary master-slave switching authority to realize the temporary communication function of the Bluetooth earphone, and the audio playing of the default main device resumes after the communication ends, thereby improving the user experience.

Figure 4:
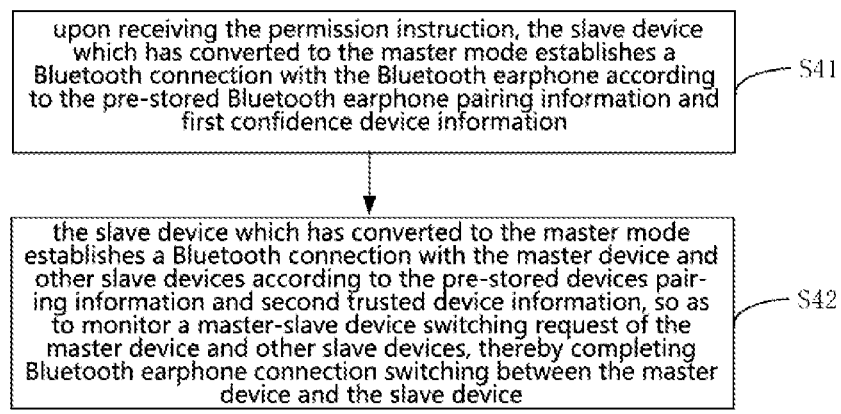
FIG. 4 is a schematic flowchart according to a third embodiment of a Bluetooth earphone connection switching method of the present application.

Referring to FIG. 4, which is a schematic flowchart according to a third embodiment of a Bluetooth earphone connection switching method of the present application.

Based on the embodiment shown in FIG. 3, in the present embodiment, the step S40 specifically includes:

Step S41, upon receiving the permission instruction, the slave device which has converted to the master mode establishes a Bluetooth connection with the Bluetooth earphone according to the pre-stored Bluetooth earphone pairing information and first confidence device information; and Step S42, the slave device which has converted to the master mode establishes a Bluetooth connection with the master device and other slave devices according to the pre-stored Bluetooth earphone pairing information and second confidence device information, so as to monitor a master-slave device switching request of the master device and other slave devices, thereby completing Bluetooth earphone connection switching between the master device and the slave device.

Wherein, before step S10, the method further includes:
 the communication connection includes a Bluetooth connection, and before the step that the master device establishes a communication connection with all slave devices and establishes a Bluetooth connection with a Bluetooth earphone, the method further includes:
 the master device sets all of the slave devices and the Bluetooth earphone as confidence devices;
 all of the slave devices set the master device and the Bluetooth earphone as confidence devices; and
 the master controller sets the master device and all of the slave devices as confidence devices of the Bluetooth earphone.

In this embodiment, the device A is used as the master device and the device A initiates a calling to find out the Bluetooth devices that can be searched in the around. When the device A finds out a slave device B, a slave device C, and a Bluetooth earphone, the device A conducts pairing with the slave device B, the slave device C, and the Bluetooth earphone. At that time, the device B, device C, and the Bluetooth earphone record the confidence information of the device A, and the devices have been paired do not need to be re-paired at the next calling. The device B is used as the master device and the device B repeats the above operations to enable other devices to record the confidence information of device B, so that re-pairing is not required at the next calling. The device C is used as the master device and the device C repeats the above operations to enable other devices to record the confidence information of device C, so that re-pairing is not required at the next calling. When the slave device B is dialed in, the slave device B sends the communication service request information to the master device A, and the master device A receives the request information and replies to the slave device B with a response of allowing master-slave switching, and then spontaneously disconnects the connection with the slave devices (including the Bluetooth earphone, the device A and the device C), and converts to the slave mode. The master device A becomes the slave device A. After the slave device B receives the response of allowing master-slave switching sent by the master device A, the slave device B converts to the master mode, and the slave device B becomes the master device B. The master device B initiates a calling, and since the device B has completed the pairing with the Bluetooth earphone, device A and device C in advance, the information such as the address and pairing password of the above devices is obtained, the master device B can directly call the above-mentioned slave devices. The above-mentioned slave devices have recorded the confidence information of device B, and can directly establish the connection without pairing once again, therefore realizing the Bluetooth connection between the master device B and the Bluetooth earphone, the device A, the device C, so as to realize the automatic switching of master device of the Bluetooth earphone, that is, the Bluetooth earphone playing the audio content of device A switches to the communication operation of device B.

In addition, an embodiment of the present application further provides a Bluetooth earphone connection switching apparatus.

Figure 5:
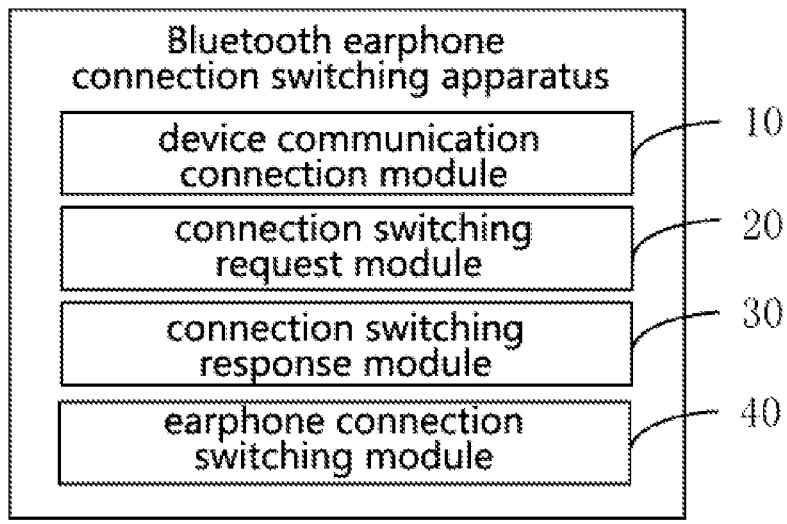
FIG. 5 is a schematic view of functional modules according to a first embodiment of a Bluetooth earphone connection switching apparatus of the present application.

Referring to FIG. 5, which is a schematic view of functional modules according to a first embodiment of a Bluetooth earphone connection switching apparatus of the present application.

In this embodiment, the Bluetooth earphone connection switching apparatus includes:
  a device communication connection module configured such that the master device establishes a communication connection with all slave devices and establishes a Bluetooth connection with a Bluetooth earphone;
  a connection switching request module configured such that, upon detecting a preset event, a slave device sends an earphone connection request instruction to the master device and converts to a master mode;
  a connection switching response module configured such that, upon receiving the earphone connection request instruction, the master device disconnects the Bluetooth connection with the Bluetooth earphone; and
  an earphone connection switching module configured such that, upon receiving a permission instruction fed back by the master device, the slave device which has converted to the master mode establishes a Bluetooth connection with the Bluetooth earphone according to pre-stored Bluetooth earphone pairing information, thereby completing Bluetooth earphone connection switching between the master device and the slave device.

Furthermore, the earphone connection request instruction includes a temporary connection request instruction, the connection switching response module includes:
  a first request judgment unit configured such that, upon detecting a preset event, the slave device determines whether the preset event is a temporary connection event according to a preset event connection list; and
  a temporary connection request unit configured such that if the preset event is the temporary connection event, the slave device, which has detected the preset event, sends the temporary connection request instruction to the master device, and converts to the master mode.

Furthermore, the temporary connection request unit is configured such that:
  the master device adds a preset identifier to the slave device which has converted to the master mode, and upon detecting an end of the preset event, the master device sends a connection authority return request to the slave device in which the preset identifier is added;
  upon receiving the connection authority return request, the slave device in which the preset identifier is added feeds back a master-slave switching response instruction to the master device, and converts to a slave mode, disconnects the Bluetooth connection with the Bluetooth earphone, and disconnects a communication connection with other slave devices; and
  upon receiving the master-slave switching response instruction, the master device converts to the master mode, establishes a Bluetooth connection with the Bluetooth earphone, and establishes a communication connection with all slave devices, so as to monitor a master-slave device switching request triggered by all of the slave devices.

The connection switching request module further includes:
  a second request judgment unit configured such that, if the preset event is not the temporary connection event, the second request judgment unit determines whether the preset event is a long-term connection event according to the preset event connection list; and
  a long-term connection request unit configured such that, if the preset event is the long-term connection event, the slave device which has detected the preset event sends the long-term connection request instruction to the master device, and converts to the master mode.

The connection switching apparatus further includes a master controller and a master-slave device determination module, the master-slave device determination module is further configured such that:
  the master controller acquires a connection time between all devices and the Bluetooth earphone, sets a device having the longest connection time as the master device, and sets other devices as slave devices, wherein all the devices include the master device and all of the slave devices.

Furthermore, the communication connection includes a Bluetooth connection, and the connection switching apparatus further includes a confidence device setting module, and the confidence device setting module is configured such that:
  the master device sets all of the slave devices and the Bluetooth earphone as confidence devices;
  all of the slave devices set the master device and the Bluetooth earphone as confidence devices; and
  the master controller sets the master device and all of the slave devices as confidence devices of the Bluetooth earphone.

Furthermore, the earphone connection switching module specifically includes:
  an earphone connection establishment unit configured such that, upon receiving the permission instruction, the slave device which has converted to the master mode establishes a Bluetooth connection with the Bluetooth earphone according to the pre-stored Bluetooth earphone pairing information and first confidence device information; and
  a device connection establishment unit configured such that, the slave device which has converted to the master mode establishes a Bluetooth connection with the master device and other slave devices according to the pre-stored Bluetooth earphone pairing information and second confidence device information, so as to monitor a master-slave device switching request of the master device and other slave devices, thereby completing Bluetooth earphone connection switching between the master device and the slave device.

Wherein, each module in the above-mentioned Bluetooth earphone connection switching apparatus corresponds to each step in the embodiment of the above-mentioned Bluetooth earphone connection switching method, and the functions and implementation processes thereof will not be repeated herein.

In addition, an embodiment of the present application further provides a computer readable storage medium.

The computer readable storage medium of the present application stores a Bluetooth earphone connection switching program therein, wherein, when the Bluetooth earphone connection switching program is executed by the processor, the steps of the above-mentioned Bluetooth earphone connection switching method are implemented.

Wherein, as for the method implemented when the Bluetooth earphone connection switching program is executed, reference may be made to the each of the embodiments of the Bluetooth earphone connection switching method of the present application, which will not be repeated herein.

Each of the embodiments in this specification are described in a parallel or progressive manner, and each embodiment focuses on the differences from other embodiments, and the same or similar parts between the various embodiments may be referred to each other. As for the apparatus disclosed in the embodiment, since they correspond to the method disclosed in the embodiment, the description is relatively simple. For relevant parts, please refer to the descriptions of the method.

Those of ordinary skill in the art will understand that the units and algorithm steps of each example described in conjunction with the embodiments disclosed herein can be implemented by electronic hardware, computer software, or a combination thereof. In order to clearly explain the interchangeability of hardware and software, the composition and steps of each example have been generally described in the above description in terms of function. Whether these functions are performed in a manner of hardware or software depends on the specific application and design constraints of the technical solution. Those skilled in the art may use different methods to implement the described functions for each specific application, however such implementations should not be considered beyond the scope of the present application.

The steps of the method or algorithm described in combination with the embodiments disclosed herein may be directly implemented by hardware, a software module executed by a processor, or a combination thereof. The software module may be disposed in a random access memory (RAM), a memory, a read only memory (ROM), an electrically programmable ROM, an electrically erasable programmable ROM, a register, a hard disk, a removable disk, a CD-ROM, or any other form of storage medium known in the art.

It should be noted that relational terms such as first and second described herein are only used to distinguish one entity or operation from another entity or operation, and do not necessarily require or imply any such actual relationship or order between these entities or operations. Moreover, terms such as "comprise", "include" or any other variation thereof are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "comprising a . . . " does not preclude the presence of additional identical elements in the process, method, article or apparatus including the elements.

What is claimed is:

1. A Bluetooth earphone connection switching method, wherein the

Bluetooth earphone connection switching method is applied to a Bluetooth earphone connection switching apparatus, the Bluetooth earphone connection switching method comprises the following steps:

a master device establishes a communication connection with all slave devices, and establishes a Bluetooth connection with the Bluetooth earphone;

upon detecting a preset event, one slave device sends an earphone connection request instruction to the master device, and converts to a master mode;

upon receiving the earphone connection request instruction, the master device disconnects the Bluetooth connection with the Bluetooth earphone; and upon receiving a permission instruction fed back by the master device, the slave device which has converted to the master mode establishes a Bluetooth connection with the Bluetooth earphone according to pre-stored Bluetooth earphone pairing information, thereby completing Bluetooth earphone connection switching between the master device and the slave devices, wherein the earphone connection request instruction comprises a temporary connection request instruction, and the step that upon detecting a preset event, one slave device sends an earphone connection request instruction to the master device, and converts to a master mode comprises:

upon detecting the preset event, one slave device determines whether the preset event is a temporary connection event according to a preset event connection list; and if the preset event is the temporary connection event, the slave device which has detected the preset event sends the temporary connection request instruction to the master device, and converts to the master mode.

2. The Bluetooth earphone connection switching method of claim 1, wherein after the step that if the preset event is the temporary connection event, the slave device which has detected the preset event sends the temporary connection request instruction to the master device, and converts to the master mode, the Bluetooth earphone connection switching method further comprises:

the master device adds a preset identifier to the slave device which has converted to the master mode, and upon detecting an end of the preset event, the master device sends a connection authority return request to the slave device in which the preset identifier is added;

upon receiving the connection authority return request, the slave device in which the preset identifier is added feeds back a master-slave switching response instruction to the master device, and converts to a slave mode, disconnects the Bluetooth connection with the Bluetooth earphone, and disconnects a communication connection with other slave devices; and upon receiving the master-slave switching response instruction, the master device converts to the master mode, establishes a Bluetooth connection with the Bluetooth earphone, and establishes a communication connection with all of the slave devices, so as to monitor a master-slave device switching request triggered by all of the slave devices.

3. The Bluetooth earphone connection switching method of claim 1, wherein the earphone connection request instruction comprises a long-term connection request instruction, and after the step that upon detecting the preset event, one slave device determines whether the preset event is a temporary connection event according to a preset event connection list, the Bluetooth earphone connection switching method further comprises:

if the preset event is not the temporary connection event, determines whether the preset event is a long-term connection event according to the preset event connection list; and if the preset event is the long-term connection event, the slave device which has detected the preset event sends the long-term connection request instruction to the master device and converts to the master mode.

4. The Bluetooth earphone connection switching method of claim 1, wherein the connection switching apparatus further comprises a master controller, and before the step that the master device establishes a communication connection with all of the slave devices, and establishes a Bluetooth connection with the Bluetooth earphone, the Bluetooth earphone connection switching method further comprises:

the master controller acquires a connection time between all devices and the Bluetooth earphone, sets a device having the longest connection time as the master device, and sets other devices as slave devices, wherein all of the devices comprise the master device and all of the slave devices.

5. The Bluetooth earphone connection switching method of claim 4, wherein the communication connection comprises a Bluetooth connection, and before the step that the master device establishes a communication connection with all of the slave devices, and establishes a Bluetooth connection with a Bluetooth earphone, the Bluetooth earphone connection switching method further comprises:

the master device sets all of the slave devices and the Bluetooth earphone as confidence devices;

all of the slave devices set the master device and the Bluetooth earphone as confidence devices; and the master controller sets the master device and all of the slave devices as confidence devices of the Bluetooth earphone.

6. The Bluetooth earphone connection switching method of claim 5, wherein the step that upon receiving a permission instruction fed back by the master device, the slave device which has converted to the master mode establishes a Bluetooth connection with the Bluetooth earphone according to pre-stored Bluetooth earphone pairing information, thereby completing Bluetooth earphone connection switching between the master device and the slave device comprises:

upon receiving the permission instruction, the slave device which has converted to the master mode establishes a Bluetooth connection with the Bluetooth earphone according to the pre-stored Bluetooth earphone pairing information and first confidence device information; and the slave device which has converted to the master mode establishes a Bluetooth connection with the master device and other slave devices according to pre-stored Bluetooth earphone pairing information and second confidence device information, so as to monitor a master-slave device switching request of the master device and other slave devices, thereby completing Bluetooth earphone connection switching between the master device and the slave devices.

7. The Bluetooth earphone connection switching method of claim 1, wherein the preset event comprises an incoming call event, a voice call event, a video call event and/or an audio playing event.

8. A Bluetooth earphone connection switching device, wherein the Bluetooth earphone connection switching device comprises a processor, a memory, and a Bluetooth earphone connection switching program stored in the memory and executable by the processor, wherein when the Bluetooth earphone connection switching program is executed by the processor, the steps of the Bluetooth earphone connection switching method according to claim 1 are implemented.

9. A non-transitory computer readable storage medium, wherein the computer readable storage medium stores a Bluetooth earphone connection switching program therein, wherein when the Bluetooth earphone connection switching program is executed by a processor, the steps of the Bluetooth earphone connection switching method according to claim 1 are implemented.

\* \* \* \* \*